(12) United States Patent
McGreevey et al.

(10) Patent No.: US 11,292,210 B2
(45) Date of Patent: Apr. 5, 2022

(54) PACKAGING MACHINE

(71) Applicant: HEAT SEAL LLC, Cleveland, OH (US)

(72) Inventors: John McGreevey, Mayfield Heights, OH (US); Thomas Williams, Hudson, OH (US)

(73) Assignee: HEAT SEAL LLC, Cuyahoga Heights, OH (US)

( * ) Notice: Subject to any disclaimer, the term of this patent is extended or adjusted under 35 U.S.C. 154(b) by 143 days.

(21) Appl. No.: 16/479,960

(22) PCT Filed: Jan. 31, 2018

(86) PCT No.: PCT/US2018/016109
§ 371 (c)(1),
(2) Date: Jul. 23, 2019

(87) PCT Pub. No.: WO2018/144520
PCT Pub. Date: Aug. 9, 2018

(65) Prior Publication Data
US 2019/0344510 A1 Nov. 14, 2019

Related U.S. Application Data

(60) Provisional application No. 62/452,489, filed on Jan. 31, 2017.

(51) Int. Cl.
*B29C 65/00* (2006.01)
*B29C 65/24* (2006.01)
(Continued)

(52) U.S. Cl.
CPC .......... *B29C 66/849* (2013.01); *B29C 65/245* (2013.01); *B29C 66/431* (2013.01);
(Continued)

(58) Field of Classification Search
CPC ... B29C 66/849; B29C 65/245; B29C 66/431; B29C 66/8122; B29C 66/81871;
(Continued)

(56) References Cited

U.S. PATENT DOCUMENTS

| | | | |
|---|---|---|---|
| 2009/0251832 A1* | 10/2009 | Brugner | H01R 13/6683 361/42 |
| 2012/0060447 A1* | 3/2012 | Liu | B29C 65/224 53/434 |
| 2014/0020330 A1* | 1/2014 | Simmons, Jr | B29C 66/849 53/76 |

FOREIGN PATENT DOCUMENTS

| | | | |
|---|---|---|---|
| GB | 929809 | 6/1963 | |
| GB | 929809 A * | 6/1963 | ....... B29C 66/81261 |

(Continued)

OTHER PUBLICATIONS

Extended European Search Report—EP 18 74 8580—dated Nov. 5, 2020.

*Primary Examiner* — George R Koch
(74) *Attorney, Agent, or Firm* — Tarolli, Sundheim, Covell & Tummno LLP (57) ABSTRACT

A packaging machine including a hot plate assembly adapted to fuse a length of heat-sensitive film wrapped around a package. A controller is adapted to calculate a time period the heating element is energized to fuse the length of heat-sensitive film wrapped around the package based on an initial temperature of the heating element. A hot plate status indicator is adapted to indicate at least to different statuses of operation of the packaging machine.

20 Claims, 13 Drawing Sheets

(51) Int. Cl.
*B65B 57/10* (2006.01)
*B29C 65/74* (2006.01)

(52) U.S. Cl.
CPC .... *B29C 66/8122* (2013.01); *B29C 66/81871* (2013.01); *B29C 66/91421* (2013.01); *B29C 66/9674* (2013.01); *B65B 57/10* (2013.01); *B29C 65/7451* (2013.01); *B29C 66/8167* (2013.01); *B29C 66/91213* (2013.01); *B29C 66/91231* (2013.01); *B29C 66/9441* (2013.01)

(58) Field of Classification Search
CPC .......... B29C 66/91421; B29C 66/9674; B29C 65/7451; B29C 66/8167; B29C 66/91213; B29C 66/91231; B29C 66/9441; B65B 57/10
See application file for complete search history.

(56) References Cited

FOREIGN PATENT DOCUMENTS

WO          2016051830 A1    4/2016
WO     WO-2016051830 A1 *  4/2016  ........... B29C 66/849

* cited by examiner

PACKAGING MACHINE

CROSS REFERENCES TO RELATED APPLICATIONS

This application filed under 35 U.S.C § 371 is a national phase application of International Application Serial Number PCT/US2018/016109 filed Jan. 31, 2018, which claims priority to U.S. Provisional Application 62/452,489, filed Jan. 31, 2017.

RELATED APPLICATIONS

This application claims priority to U.S. Provisional Application No. 62/452,489, filed Jan. 31, 2017, the entirety of which is incorporated herein by reference.

TECHNICAL FIELD

The present invention relates generally to packaging systems, and, in particular, to a new and improved packaging machine.

BACKGROUND ART

Wrapping machines of the type that are used to hand-wrap packages with a thin, often clear, film are often used in supermarkets to wrap meat, cheese, etc. In a typical machine, a foam tray on which the meat or cheese is placed is hand-wrapped with a length of stretchable film that is dispensed from a roll on the wrapping machine. Once wrapped, the film is severed and the edges of the sheet are folded and tucked on the underside of the package. Heat is then used to fuse the film, thus sealing the package. A hot plate surface is heated to a predetermined temperature that is related to the temperature needed to cause melting or fusion of the film used to wrap the package.

DISCLOSURE OF THE INVENTION

The present invention provides a new and improved packaging machine of the type that is used to hand-wrap a package with a stretchable film. The present invention provides a supply of film for wrapping a package, a means for severing a length of the film and a hot plate surface for effecting fusion and sealing of the film that is wrapped around the package.

According to one aspect of the invention, a packaging machine for wrapping a package with heat-sensitive film is disclosed. The packaging machine includes a frame defining a wrapping surface. A film supply receptacle is adapted to receive a supply of heat-sensitive film. A cutting element is adapted to sever a length of heat-sensitive film from the supply used to wrap the package. A hot plate assembly is adapted to fuse the length of the heat-sensitive film wrapped around the package. The hot plate assembly includes a heating element. A controller is adapted to calculate a time period the heating element is energized to fuse the length of heat-sensitive film wrapped around the package based on an initial temperature of the heating element.

According to this aspect, the initial temperature of the heating element may be detected by a thermal feedback device. The thermal feedback device may be a thermistor. One of a thermal fuse and a ground-fault current interrupter may be adapted to interrupt energization of the heating element if a temperature of the heating element exceeds a temperature design value. The heating element may be a mica heater having a heating ramp rate of approximately 100° F. per second. A light emitting diode may be adapted to display at least two different colors to indicate at least two different operating statuses of the packaging machine.

According to another aspect of the invention, a packaging machine for wrapping a package with heat-sensitive film is disclosed. The packaging machine includes a frame defining a wrapping surface. A film supply receptacle is adapted to receive a supply of heat-sensitive film. A cutting element is adapted to sever a length of heat-sensitive film from the supply used to wrap the package. A hot plate assembly is adapted to fuse the length of heat-sensitive film wrapped around the package, the hot plate assembly including a heating element. A hot plate status indicator is adapted to indicate at least two different statuses of operation of the packaging machine.

According to this aspect, the hot plate status indicator may be a light emitting diode that displays a first color to indicate that the packaging machine is operating in a first status and a second color to indicate that the packaging machine is operating in a second status. A controller may be adapted to calculate a time period the heating element is energized to fuse the length of heat-sensitive film wrapped around the package based on an initial temperature of the heating element.

According to another aspect of the invention a method of operating a packaging machine to fuse heat-sensitive film a package is disclosed. The method includes detecting the presence of a package on a hot plate assembly of the packaging machine. A temperature of a heating element is measured. A time the heating element is energized is calculated based on the measured temperature of the heating element. The heating element is energized for the time calculated in response to the detection of the presence of the package on the hot plate assembly.

According to this aspect, the method may include the step of interrupting the step of energizing if the temperature of the heating element exceeds a temperature design value.

According to another aspect of the invention, a packaging machine for wrapping a package with heat-sensitive film is disclosed. The packaging machine includes a frame defining a wrapping surface. A film supply receptacle is adapted to receive a supply of heat-sensitive film. A heated rod is adapted to sever a length of heat-sensitive film from the supply used to wrap the package. A hot plate assembly is adapted to fuse the length of heat-sensitive film wrapped around the package. The hot plate assembly includes a mica heater heating element having a heating ramp rate of approximately 100° F. per second. The packaging machine further includes a package sensor. The heating element is energized in response to the package sensor detecting the package on the hot plate assembly. A controller is adapted to calculate a time period the heating element is energized to fuse the length of heat-sensitive film wrapped around the package based on an initial temperature of the heating element. A thermistor is adapted to sense the initial temperature of the heating element. A ground-fault current interrupter is adapted to interrupt energization of the heating element if a temperature of the heating element exceeds a temperature design value. A light emitting diode is adapted to display at least two different colors to indicate at least two different operating statuses of the packaging machine.

Additional features of the invention will become apparent and a fuller understanding obtained by reading the following detailed description made in conjunction with the accompanying drawings.

DISCLOSURE OF INVENTION

Figure 1:
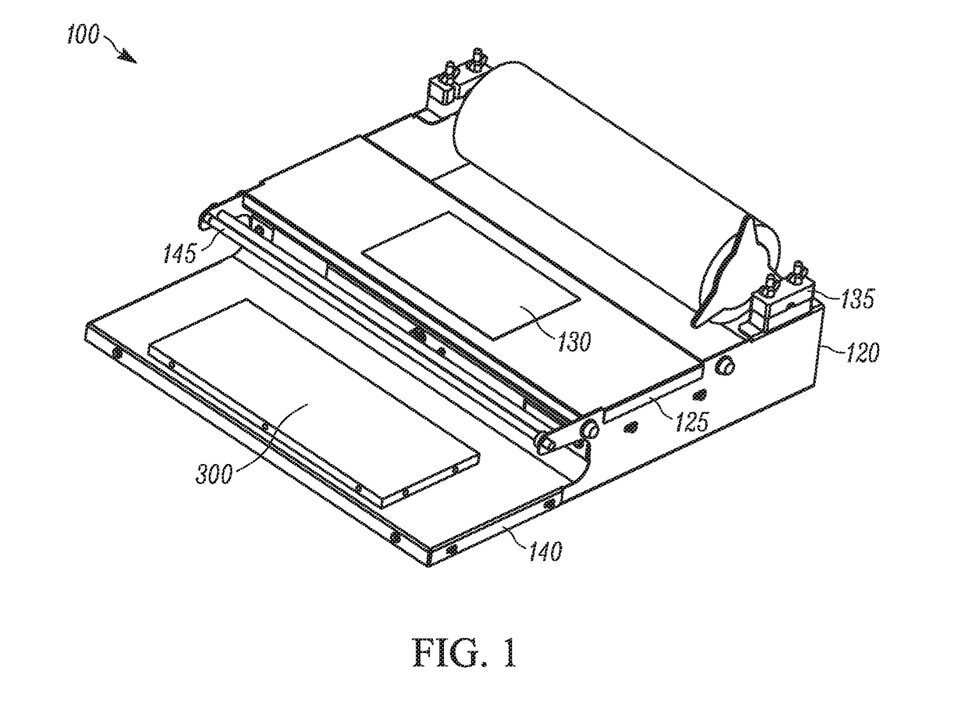
FIG. 1 is an isometric view of a packaging machine according to the present invention.
Figure 2:
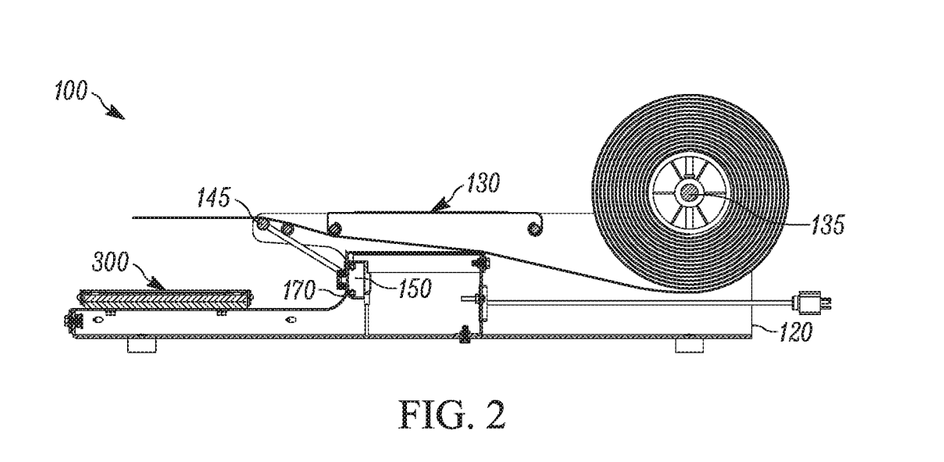
FIG. 2 is a sectional view through a center of the packaging machine of FIG. 1.

A packaging machine 100 according to one aspect of the present invention is illustrated in FIGS. 1 and 2. As understood by one skilled in the art, the packaging machine 100 may be used to wrap packages with a stretchable heat-sensitive film. Upon wrapping the package with the heat-sensitive film, heat may be used to fuse the film together so as to seal the package. This type of machine is often used in, for example, supermarkets to package produce, meat, etc.

The packaging machine 100 includes a frame 120. The frame 120 may be constructed as set forth in U.S. Pat. No. 9,346,577 B2 (Appendix A), the entirety of which is herein incorporated by reference, or as set forth in U.S. Patent Application Publication No. 2014/0020330 A1 (Appendix B), the entirety of which is likewise herein incorporated by reference. It is contemplated, however, that any other suitable frame construction may be used.

In one example, the frame 120 includes a bridge portion 125 that defines a wrapping surface 130. A film supply receptacle 135 is adjacent the wrapping surface 130. The wrapping surface 130 is adapted to receive a package that is to be wrapped with film provided by a film supply received in the film supply receptacle 135. A base plate portion 140 is also adjacent the wrapping surface 130. The wrapping surface 130 is disposed between the base plate portion 140 and the film supply receptacle 135. A hot plate assembly 300 is received on the base plate portion 140. The hot plate assembly 300 is adapted to fuse the film of the film supply.

A cutting element 145 is provided between the wrapping surface 130 and the hot plate assembly 300. The cutting element 145 is adapted to sever (i.e., cut) the film of the film supply. In one example, the cutting element 145 is a heated rod. The heated rod may be continuously energized or may be energized in response to the actuation of a switch, sensor, etc. However, it is contemplated that other cutting element arrangements besides a heated rod may be provided. A package sensor 150 is provided on a horizontal plate portion 170. The package sensor 150 is adapted to detect the presence of a package on the hot plate assembly 300. In one example, the package sensor 150 is a photo eye. However, it is contemplated that other arrangements for the package sensor may be provided. A hot plate status indicator 155 (FIG. 6) may be provided for indicating operation of the hot plate assembly 300. In one example, the hot plate status indicator 155 is a single display providing one color. However, it is contemplated that other arrangements for the hot plate status indicator 155 may be provided (e.g., single display providing multiple colors, multiple displays providing single and/or multiple colors, audible signals, haptic signals, etc.)

The hot plate assembly 300 (FIGS. 3-5) includes a base plate 310. The base plate 310 may be manufactured out of fiberglass. However, it is contemplated that the base plate 310 may be manufactured out of any other suitable material. An insulation sheet 320 is disposed on the base plate 310. A heating element 330 is disposed on the insulation sheet 320. Fasteners 340 cooperate with frame rails 350 to sandwich together the base plate 310, the insulation sheet 320, and the heating element 330. A thermal fuse 360 and a thermal feedback device 370 are interposed between the heating element 330 and the insulation sheet 320. The thermal feedback device 370 is adapted to detect the temperature of the heating element 330. As will be discussed further below, the thermal fuse 360 is adapted to interrupt power to the heating element 330.

Figure 3:
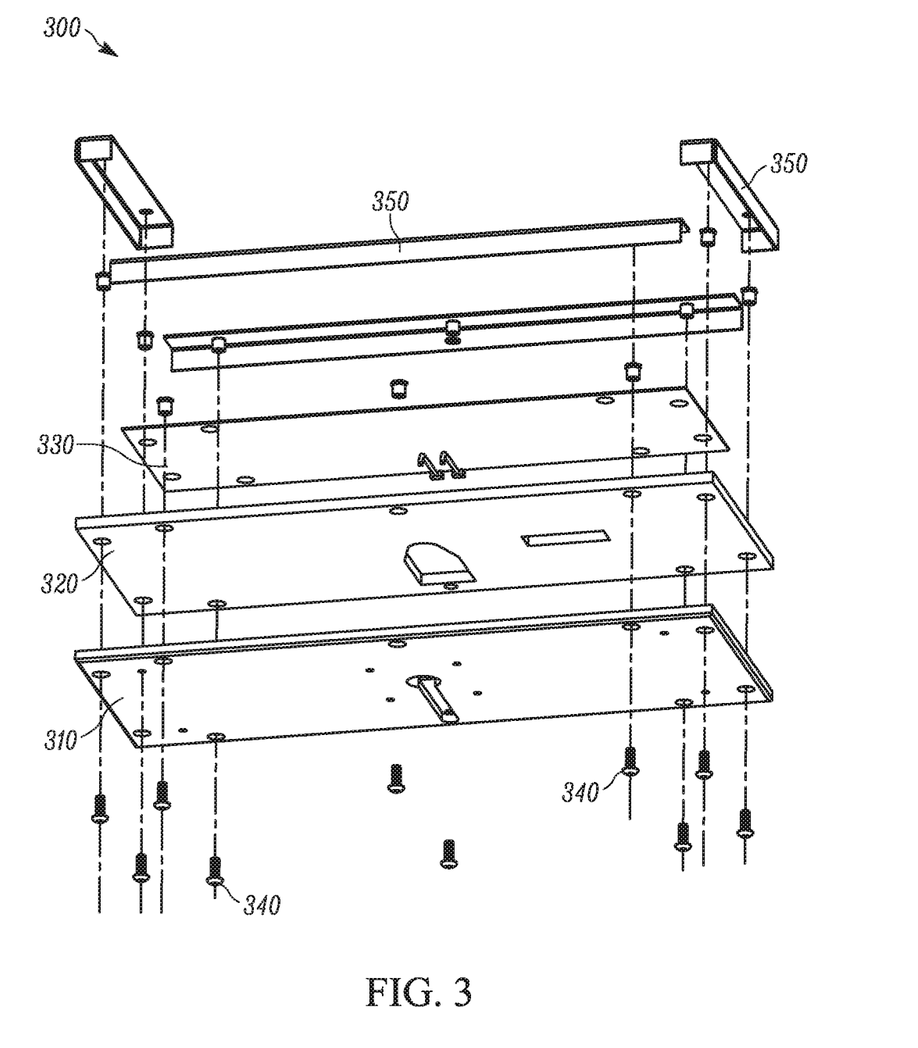
FIG. 3 is an exploded view of a hot plate mechanism that may form part of the machine of FIG. 1.
Figure 4:
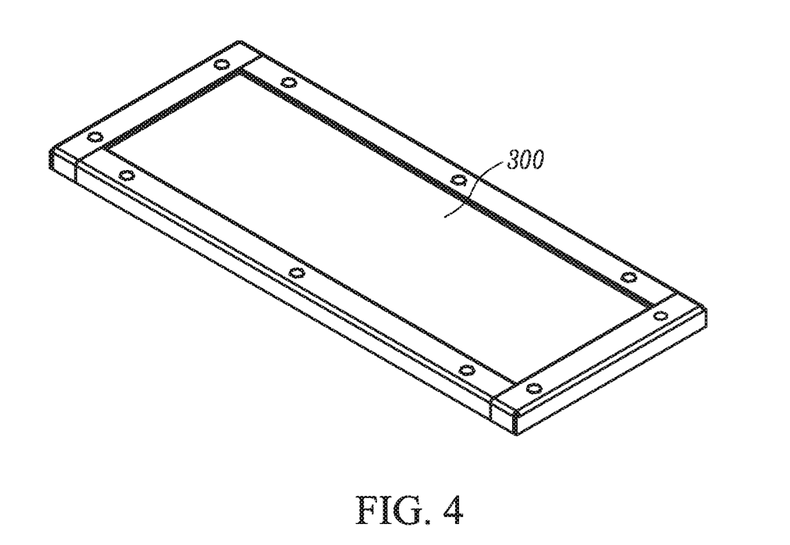
FIG. 4 is an assembled perspective view of the hot plate mechanism of FIG. 3.
Figure 5:
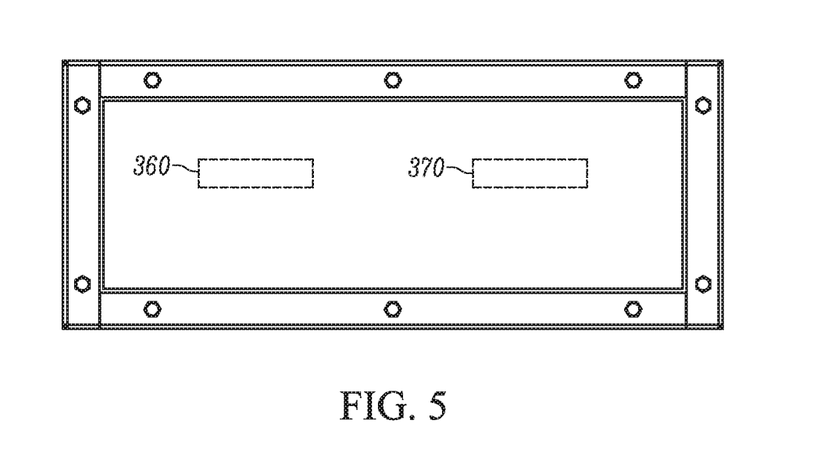
FIG. 5 is an assembled plan view of the hot plate mechanism of FIG. 3.

The heating element 330 is a mica heater. In one example, the mica heater is a DDP-0050 mica heater manufactured by Datec Coating Corporation located in Mississauga, ON, Canada. However, it is contemplated that any other suitable mica heater may be used.

The mica heater provides several advantages over foil heaters used in known packaging machines. For example, as compared to foil heaters, the mica heater discharges a greater amount of energy into fusing the film that is wrapped around a package. That is, as compared to heat generated by foil heaters, a greater percentage of heat generated by the mica heater flows toward the package placed on the hot plate assembly 300 as opposed to flowing away from the package and toward the insulation sheet 320. Additionally, the heating ramp rate for a mica heater is approximately 100° F. per second, which is appreciably quicker than the 60° F. per second heating ramp rate achievable by foil heaters.

Furthermore, the mica heater is an electrical insulator, which eliminates the possibility of ground faults that may be experienced with a foil heater. The mica heater also increases the robustness of the hot plate assembly 300, as operation of the mica plate is not disturbed by the formation of holes in the heating element 330. This is in comparison to foil heaters, which may fail when holes form in a respective heating element.

Figure 7:
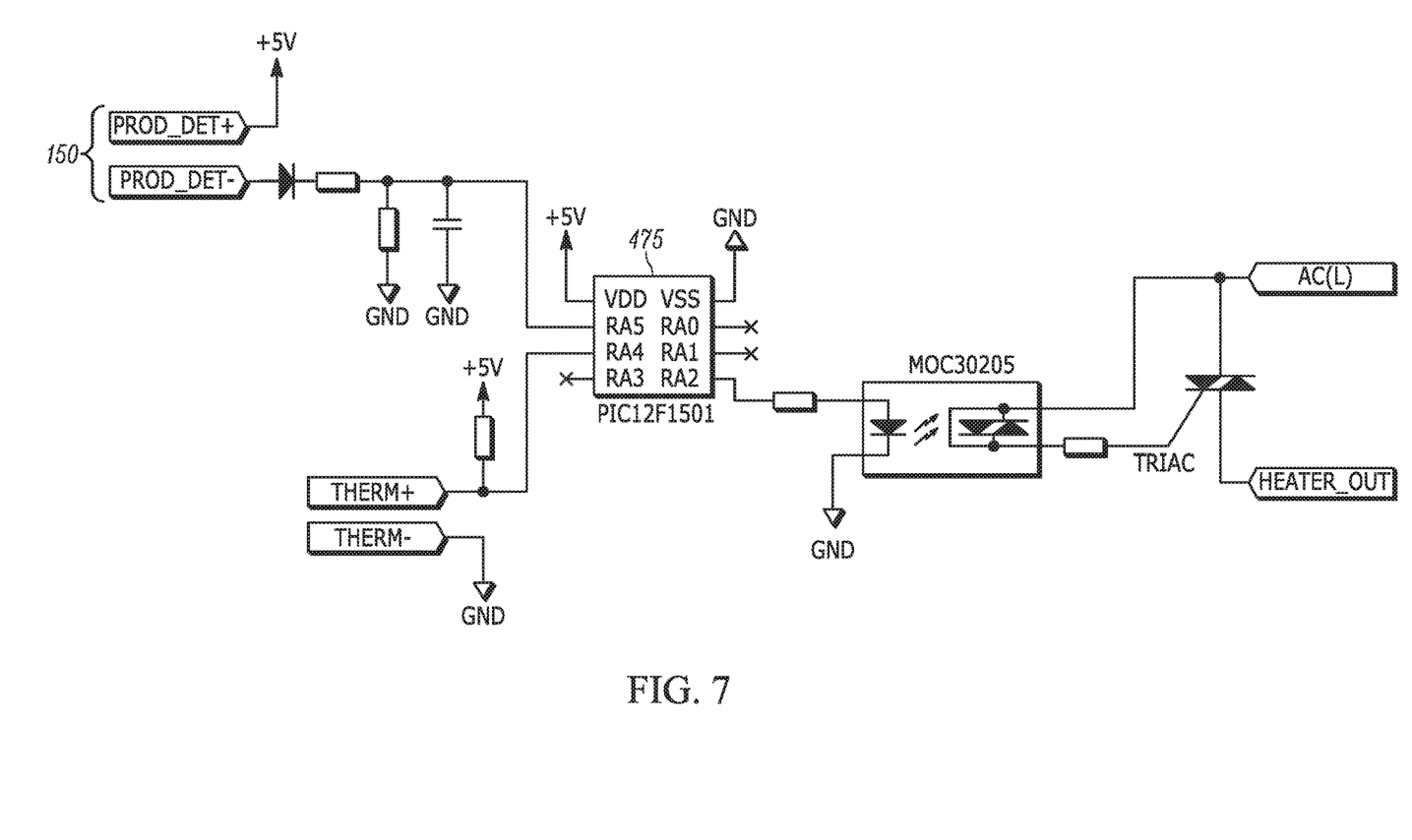
FIG. 7 shows details of a controller that may be part of the control board of FIG. 6.
Figure 8:
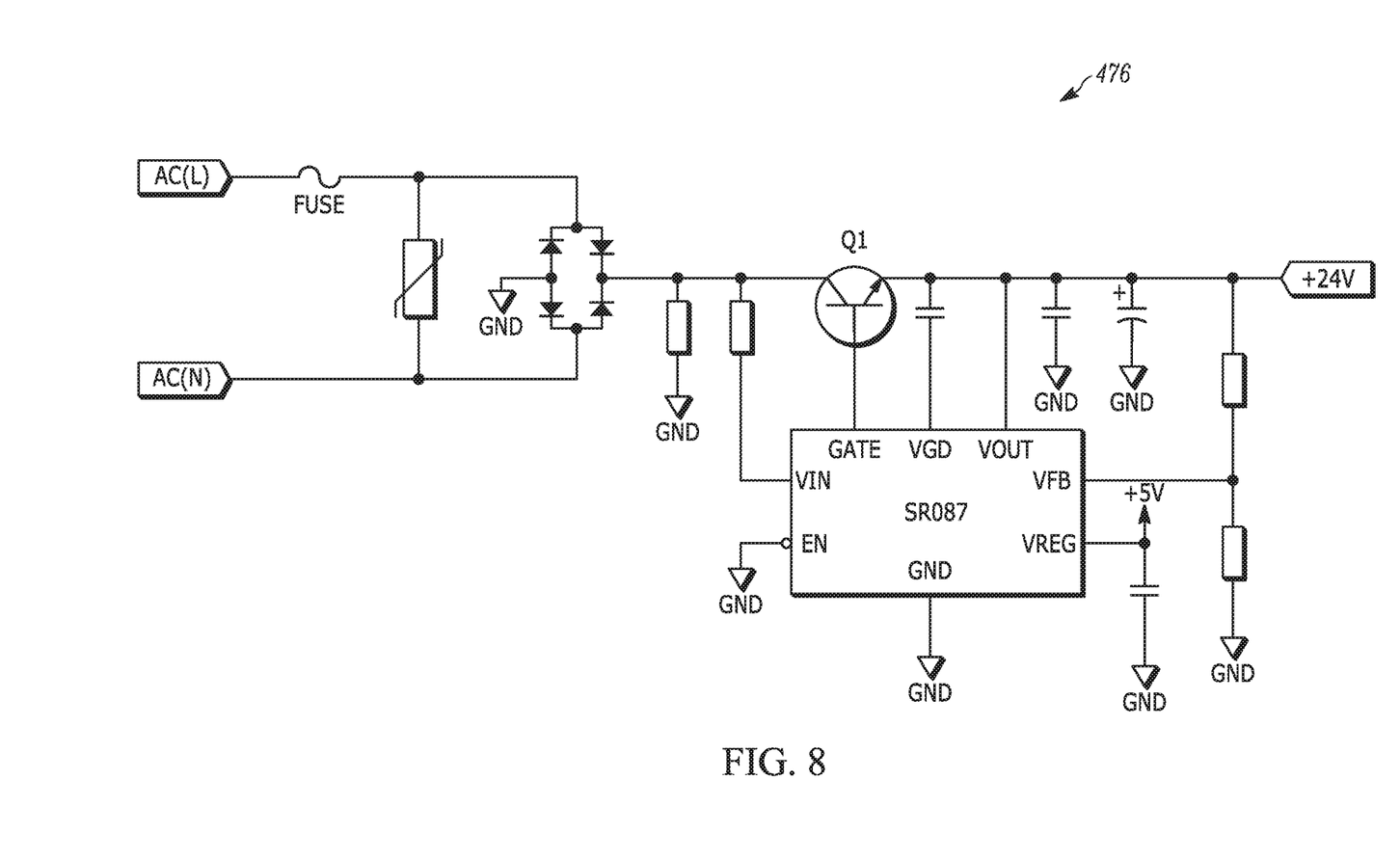
FIG. 8 shows details of a power output that may be part of the control board of FIG. 6.
Figure 9:
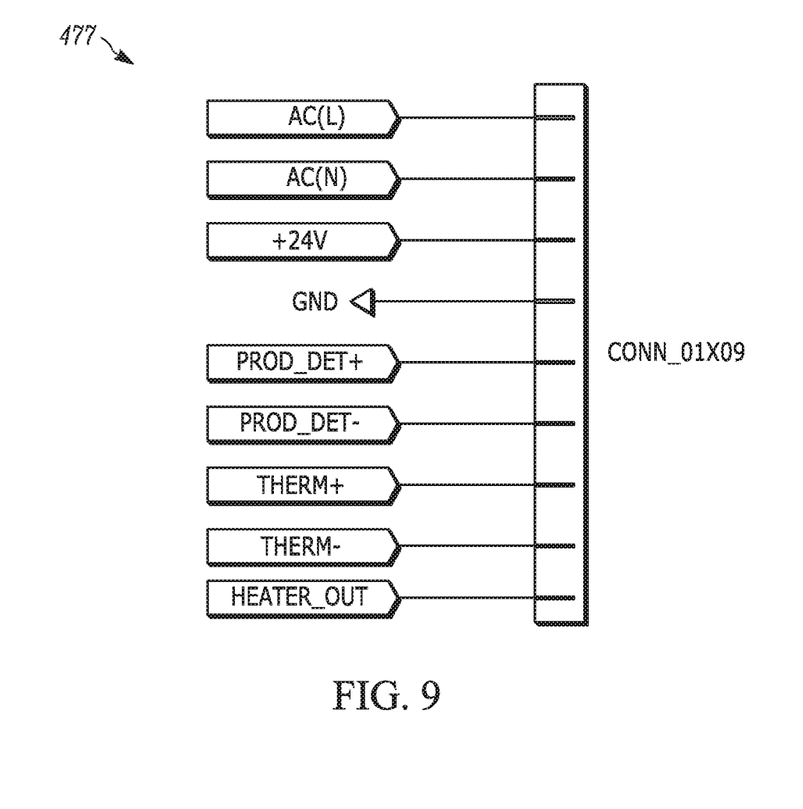
FIG. 9 shows details of a terminal block that may be part of the control board of FIG. 6.
Figure 10:
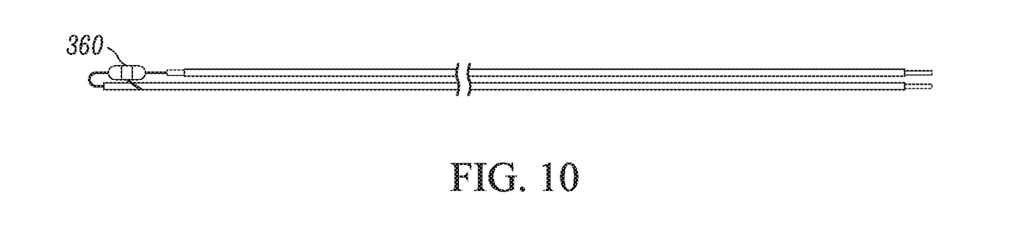
FIG. 10 illustrates a thermal fuse that may form part of the circuitry of FIG. 6.
Figure 11:
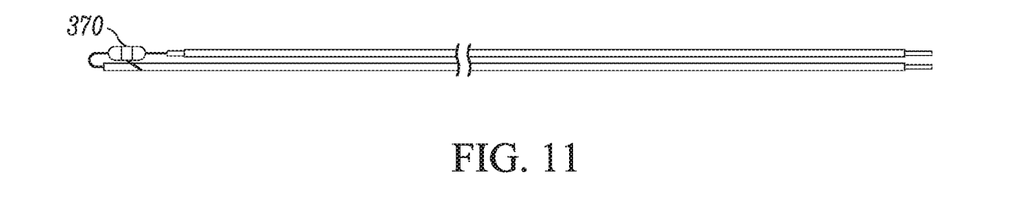
FIG. 11 illustrates a temperature feedback device that may form part of the circuitry of FIG. 6.

Due to the comparatively rapid heating ramp rate characteristics of the mica heater heating element 330, it may be desirable to provide a control system having excellent responsiveness and noise tolerance characteristics. To this end, circuitry 400 (FIG. 6) for the packaging machine 100 is provided with the above mentioned thermal feedback device 370 and thermal fuse 360. In one example, the thermal feedback device 370 (FIGS. 5, 6, 11) may be a 504NT thermistor manufactured by Semitec Corporation of Torrance, Calif. However, it is contemplated that any other suitable thermal feedback device may be used. In one example, the thermal fuse 360 (FIG. 5, 6, 10) may be a DF184 thermal fuse manufactured by Cantherm of Montreal, Canada. However, it is contemplated that any other suitable thermal fuse may be used. The circuitry 400 further includes a control board 450 having a controller 475 (FIG. 7). In one example, the controller 475 may be a PIC 12F1501 controller manufactured by Microchip Technology, Inc. of Chandler, Ariz. However, it is contemplated that any other suitable controller may be used. In addition to the controller 475, the control board 450 may also include a power output 476 (FIG. 8) and a terminal block 477 (FIG. 9).

Energization of the hot plate assembly 300 now be described.

The presence of a package on the hot plate assembly 300 is monitored by the package sensor 150. In response to the detection of the presence of a package on the hot plate assembly 300 by the package sensor 150, the heating element 330 is energized and the hot plate status indicator 155 is turned on to indicate the initiation of a sealing cycle. Concurrent with energization of the heating element 330, the thermal feedback device 370 senses the temperature of the heating element 330.

Based on the sensed temperature of the heating element 330 and the heating ramp rate characteristics of the heating element (e.g., 100° F. per second), the controller 475 calculates a heat time that the heating element 330 should be energized to reach a temperature that is sufficient to fuse the film (i.e., fusing temperature). In one example, the fusing temperature is approximately 350° F. However, it should be apparent that the fusing temperature may be dependent on, for example, the thickness of the film, the material used to manufacture the film, the number of layers of film, etc. To this end, it is contemplated that the packaging machine 100 may include provisions for adjusting the fusing temperature. Additionally, it is contemplated that the packaging machine 100 may include provisions for automatically sensing film characteristics (i.e., thickness, material, etc.) and adjusting the fusing temperature accordingly.

One the calculated heat time is reached, the hot plate status indicator 155 may remain on for an additional time period before turning off to indicate completion of the fusing cycle. In one example, the additional time period is 0.5 seconds. However, it contemplated that a longer or shorter time period may be used for the additional time period. Additionally, it is contemplated that the hot plate status indicator 155 may turn off as soon as the calculated heat time is reached (i.e., no additional time period). Furthermore, although the additional time period has been described as being a predetermined, set time period, it is contemplated that an additional time period (if any) may be calculated for each fusing cycle.

If so arranged, once the additional time period elapses, the heating element 330 is de-energized and the hot plate status indicator 155 is turned off to indicate completion of the fusing cycle. However, it is contemplated that the heating element 330 may be de-energized as soon as the calculated heat time is reached. That is, the heating element 330 may de-energized while the hot plate status indicator 155 remains on for the duration of the fusing cycle. In any case, the heating element 330 remains de-energized until the package sensor 150 again detects the presence of a package on the hot plate assembly 300, at which point the above operation may be repeated.

In the above described operation, the controller 475 assumes that the heating element 330 reaches the desired fusing temperature once the calculated heat time is reached. That is, the controller 475 does not check that the heating element 330 actually reaches the desired fusing temperature. It is contemplated, however that the controller 475 may evaluate the temperature of the heating element 330 at the conclusion of the calculated heat time and adjust the heat time based on this evaluation.

The heat time calculated by the controller 475 is the maximum time that the heating element 330 should be energized to reach the fusing temperature. It is contemplated, however, that there may be instances where energizing the heating element 330 for the entire duration of time calculated by the controller 475 would result in the temperature of the heating element 330 exceeding a temperature design value. In one example, to prevent this occurrence, the thermal fuse 360 is arranged to interrupt power to the heating element 330 should the heating element 330 temperature exceed the temperature design value. That is, should the heating element 330 exceed the temperature design value, the thermal fuse 360 interrupts power such that the heating element 330 is energized for a time period that is less than the heat time calculated by the controller 475.

In order to maintain a desired heating element 330 temperature, the thermal fuse 360 may be adapted to "reset" so as to restore power back to the heating element 330 once the temperature of the heating element 330 drops to a specified level. However, it is contemplated that the thermal fuse 360 may be arranged so as to require a manual reset by an operator before power is restored to the heating element 330.

The interruption of the power to the heating element 330 due to action of the thermal fuse 360 may not alter the total time of the fusing cycle. In other words, if the controller 475 initially calculates a heat time that results in the fusing cycle being a total of three seconds (for example), the package should remain on the hot plate assembly 300 for three seconds to achieve sufficient fusing of the film regardless of whether the thermal fuse 360 interrupts power to the heating element 330. To this end, the hot plate status light 300 would remain on for the entire three seconds regardless of whether the thermal fuse 360 interrupts power to the heating element so as to indicate to an operator that the package should remain on the hot plate assembly 300. However, it is contemplated that the heat time calculated by the controller 475 (and thus the total time of the complete fusing cycle) may be reevaluated and/or changed in response to the thermal fuse 360 interrupting power to the heating element 330.

A typical wrapping operation will now be described. First, film from the film supply is wrapped around a package. It is contemplated that the package may be located on the wrapping surface 130 as the film is wrapped. Once the package is wrapped with a desired amount of film, the package is manipulated to bring a portion of the film extending between the package and the film supply into contact with the cutting element 145, thereby separating the wrapped film from the film supply. The wrapped package is placed on the hot plate assembly 300. The heating element 330 is energized and the hot plate status indicator 155 is turned on in response to the package sensor 150 detecting the presence of the wrapped package on the hot plate assembly 300. The package remains on the hot plate assembly 300 until the hot plate status indicator 155 turns off, which indicates that the film is fused and the package is sealed. The sealed package is then removed from the hot plate assembly 300.

Figure 12:
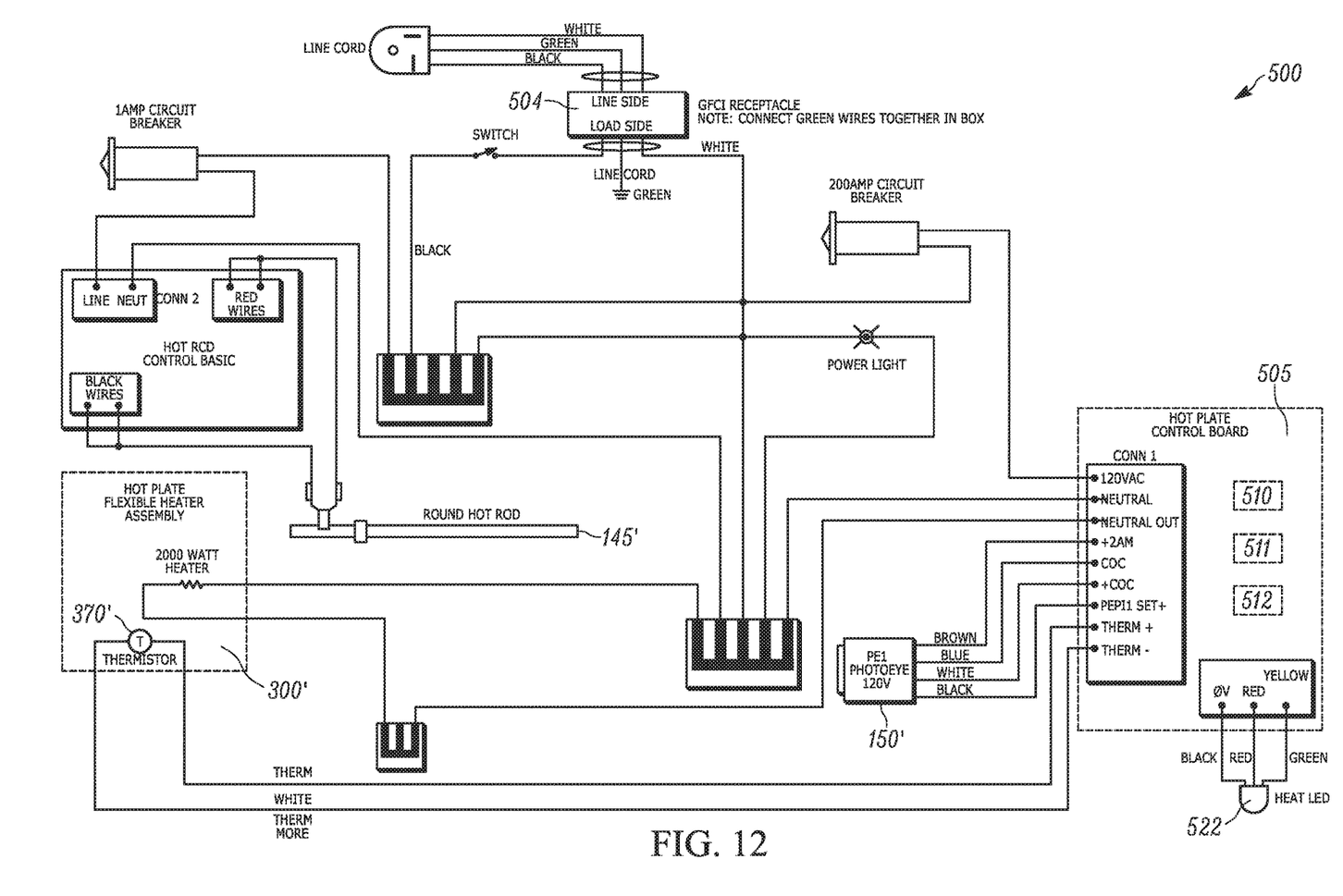
FIG. 12 is a schematic of alternate circuitry with an alternate control board that may form part of the machine of FIG. 1.
Figure 16:
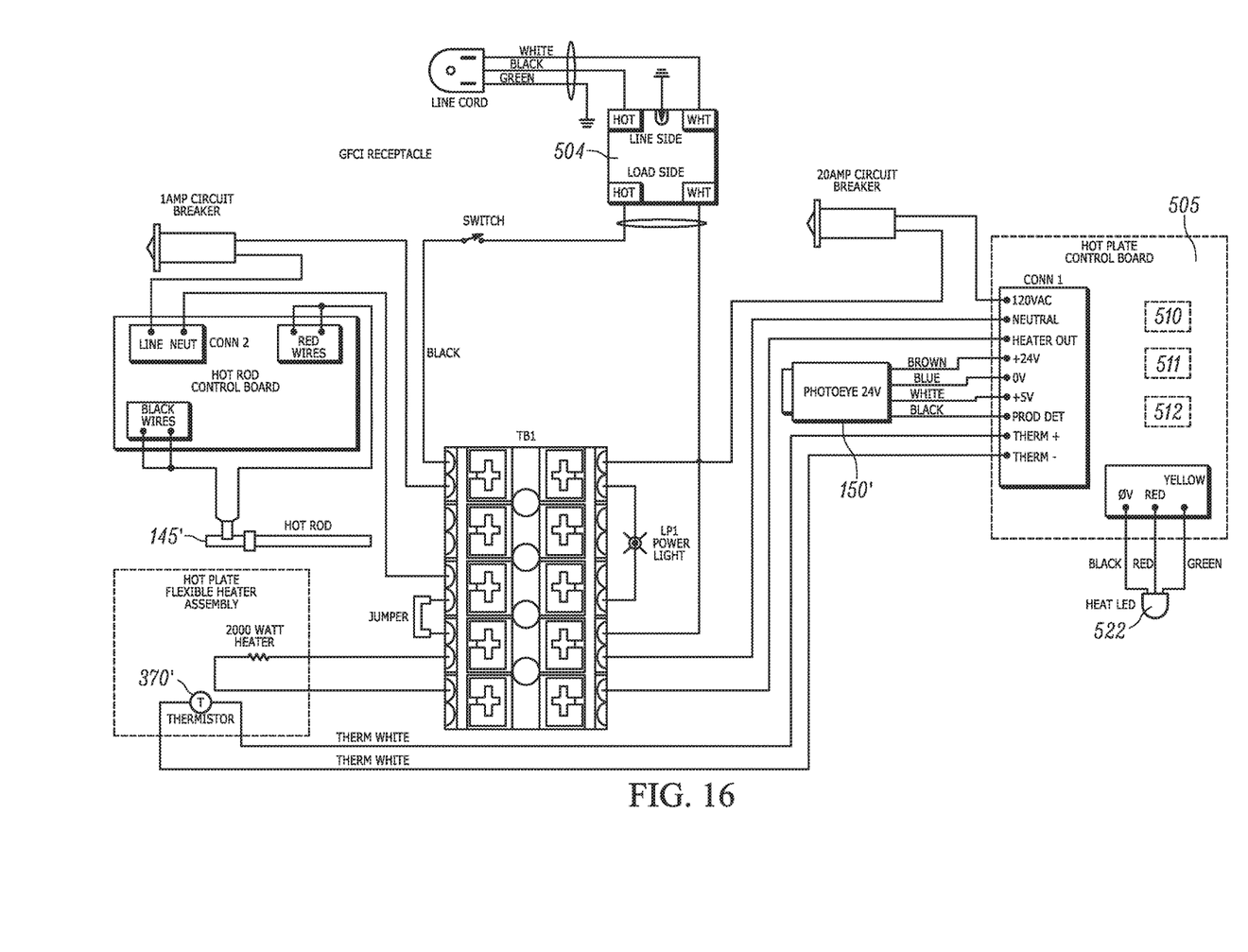
FIG. 16 is another depiction of the circuitry of FIG. 12.

Alternative circuitry 500 for the packaging machine 100 is shown in FIGS. 12 and 16. The circuitry of FIGS. 12 and 16 is substantially similar to circuitry of FIG. 6. As such, the discussion of the FIGS. 12 and 16 circuitry will mainly focus on the features unique to the circuitry of FIGS. 12 and 16. Elements of the circuitry of FIGS. 12 and 16 that correspond to like elements in the circuitry of FIG. 6 will be indicated with the same numeral with the addition of a prime (').

Figure 13:
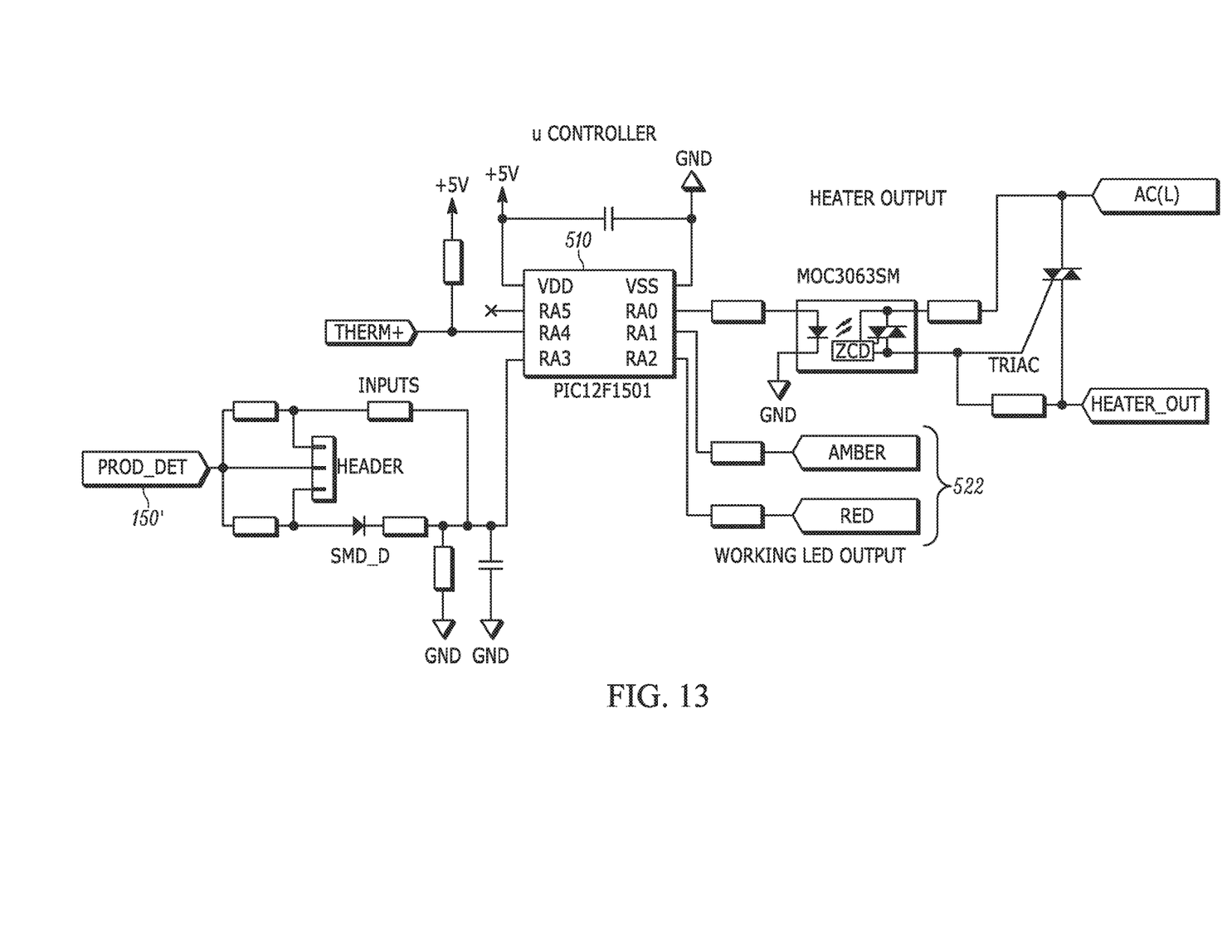
FIG. 13 shows details of a controller that may be part of the control board of FIG. 12.
Figure 14:
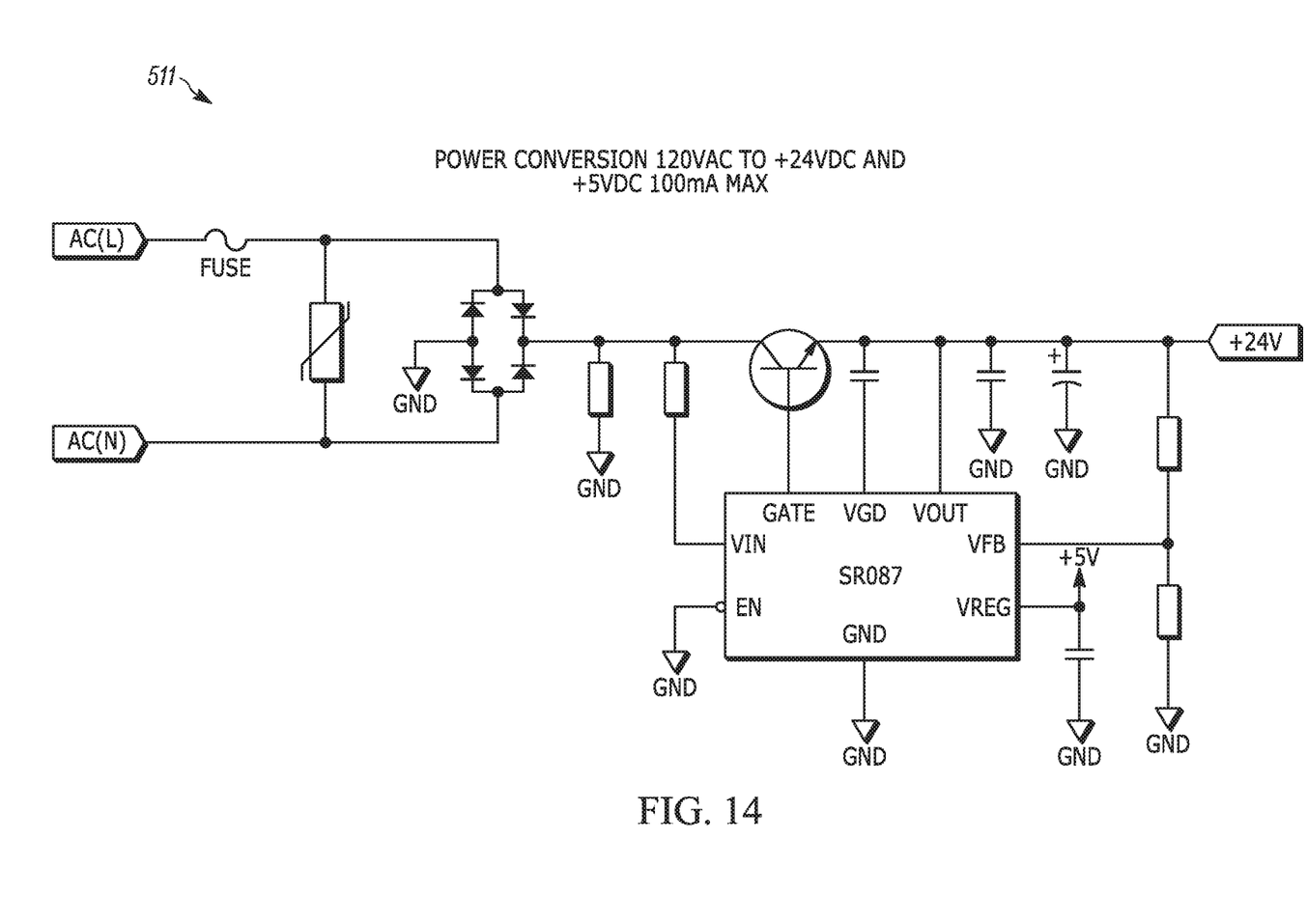
FIG. 14 shows details of a power output that may be part of the control board of FIG. 12.
Figure 15:
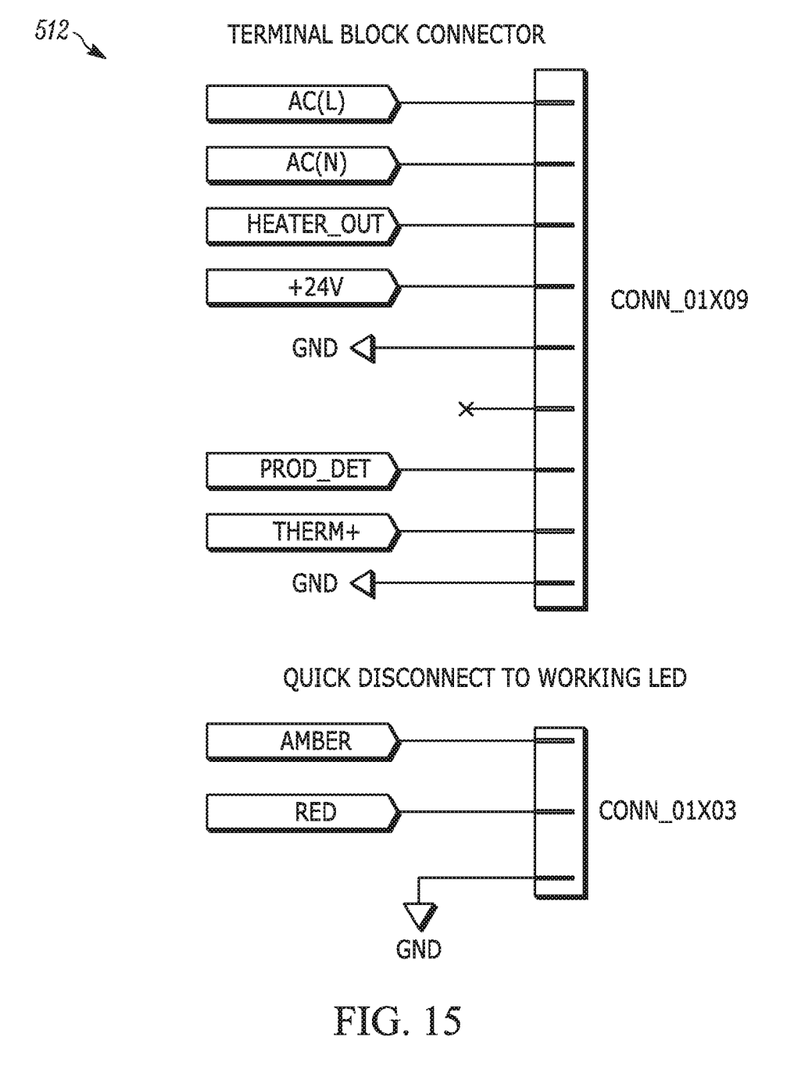
FIG. 15 shows details of a terminal block that may be part of the control board of FIG. 12.

The circuitry of FIGS. 12 and 16 is provided with a control board 505 having a controller 510 (FIG. 13). In one example, the controller 510 may be a PIC 12F1501 controller manufactured by Microchip Technology, Inc. of Chandler, Ariz. However, it is contemplated that any other suitable controller may be used. In addition to the controller 510, the control board 505 may include a power output 511 (FIG. 14) and a terminal block 512 (FIG. 15).

Figure 6:
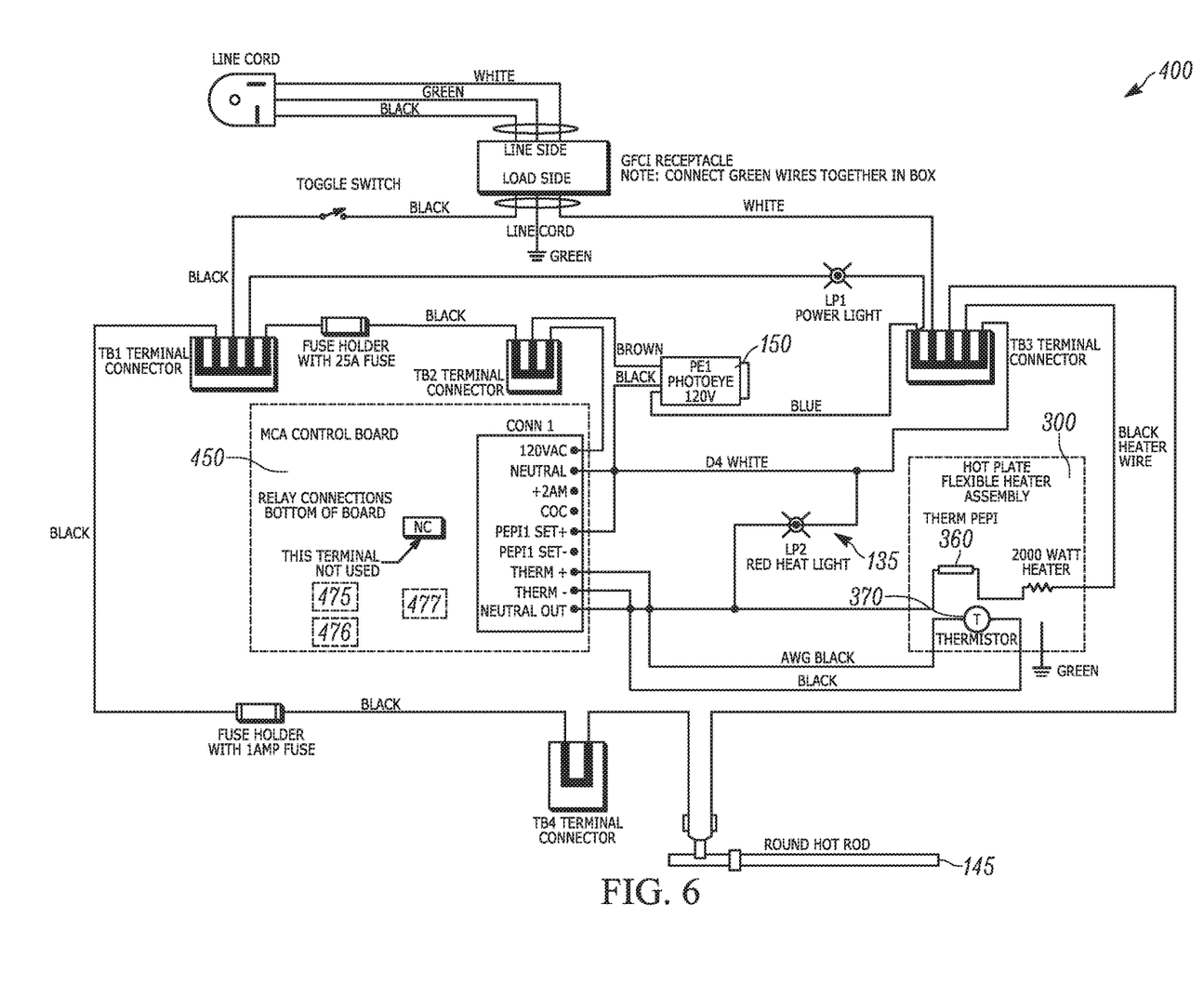
FIG. 6 is a schematic of circuitry with a control board that may form part of the packaging machine of FIG. 1.
Figure 17:
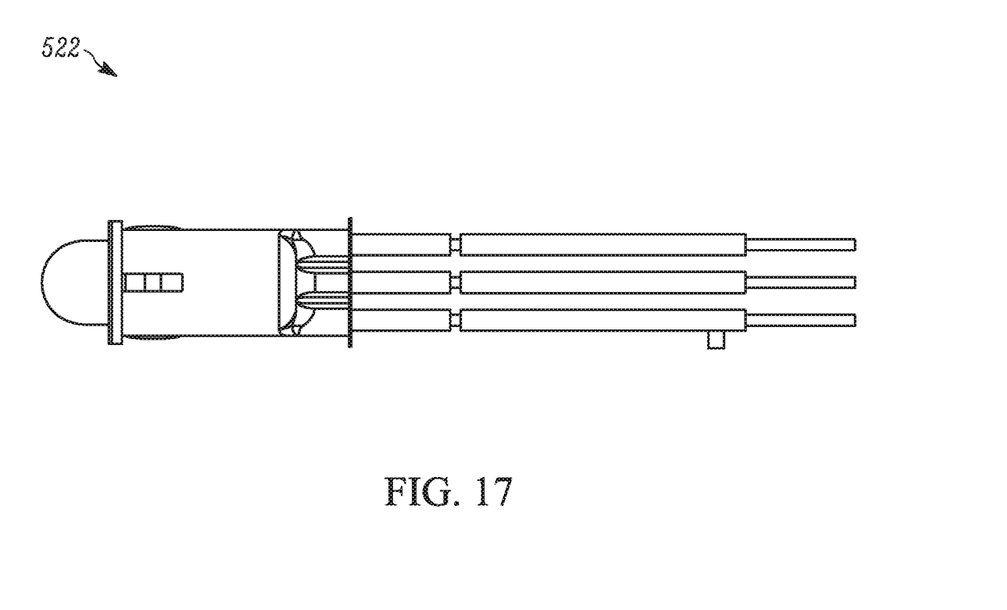
FIG. 17 is an LED that may form part of the circuitry of FIG. 12.

The circuitry of FIGS. 12 and 16 includes a multicolor status light 522 as a hot plate status indicator rather than the single color hot plate status indicator of the FIG. 6 circuitry. In one example, the multicolor status light 522 is a PM53-RYW18.0 LED manufactured by Bivar, Inc. of Irvine, Calif. (FIG. 17).

The multicolor status light 522 may be configured to display different colors to indicate different operating statuses of the packaging machine 100. For example, the multicolor status light 522 may be configured to display a first color to indicate that the heating element 330' is energized but has not yet reached fusing temperature and a second color to indicate that the heating element 330' has reached fusing temperature. As a specific example of display colors, the multicolor status light 522 may be configured to display an amber color for the first color and a red color for the second color. As another example, in addition to the aforementioned first and second colors, the multicolor status light 522 may be configured to display a third color (e.g., green) to indicate that a fusing cycle has been completed. It is contemplated that the multicolor status light 522 may be configured to display as many or as few colors as desired to indicate various operating parameters of the packaging machine 100.

The circuitry of FIGS. 12 and 16 includes a ground-fault circuit interrupter (GFCI) 504. The GFCI 504 in the circuitry of FIGS. 12 and 16 substantially replaces the function of the thermal fuse 360 of the circuitry in FIG. 6. That is, the GFCI 504 is adapted to interrupt power to the heating element 330' should the heating element 330' exceed a temperature design value. Although the GFCI 504 has been described as replacing the function of a thermal fuse, it is contemplated that the circuitry of FIGS. 12 and 16 may use a combination of a GFCI and a thermal fuse to prevent the heating element 330' from exceeding a temperature design value. Additionally, it is contemplated that the circuitry of FIGS. 12 and 16 may solely use a thermal fuse to prevent the heating element 330' from exceeding a temperature design value (similar to the arrangement of FIG. 6). Furthermore, it is contemplated that the circuitry of FIG. 6 may use a GFCI alone, or a GFCI in combination with the thermal fuse 360, to prevent the heating element 330 from exceeding a temperature design value.

The disclosed packaging machine provides advantages over known packaging machines in regard to at least package wrapping efficiency, machine robustness, and energy consumption. For example, the combination of the mica heater heating element with the remaining components that make up the hot plate assembly provides reduced fusing cycle times. In particular, the disclosed hot plate assembly heats more quickly and directs a greater amount of energy into fusing the film as compared to known hot plate assemblies that utilize a foil heating element. As another example, the properties of the mica heater heating element increase the reliability of the packaging machine due to the fact that the mica heater avoids the possibility of ground faults and also due to the fact that the mica heater can continue operating even in the presence of holes in the heating element. As yet another example, because the heating element is only energized only as long as necessary to sufficient film fusing, energy consumption is reduced. Additionally, as a result of the arrangement and combination of the thermal feedback device, the thermal fuse and/or GFCI, and the control board with the controller, the temperature of the hot plate assembly can be more precisely controlled.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims. For example, although the presence of a package on the heat plate assembly has been described as being detected by a photo eye, such presence could be detected by a pivoting platform of the type described in U.S. Pat. No. 9,346,577 B2. As another example, although the heating element has been described as a mica heater, it is contemplated that the heating element may be of a different type having similar characteristics. Although the invention has been described with a certain degree of particularity, it should be understood that those having skill in the art can make changes to the invention without departing from the spirit or scope of the invention.

What is claimed is:

1. A packaging machine for wrapping a package with heat-sensitive film, the packaging machine comprising:
   a frame defining a wrapping surface;
   a film supply receptacle adapted to receive a supply of heat-sensitive film;
   a cutting element adapted to sever a length of heat-sensitive film from the supply used to wrap the package during use;
   a hot plate assembly adapted to fuse the length of the heat-sensitive film wrapped around the package, the hot plate assembly including a heating element;
   a controller adapted to calculate and provide a ramp rate to said heating element that is energized at the ramp rate to heat said hot plate to fuse the length of heat-sensitive film wrapped around the package, the controller adapted to calculate said ramp rate comprising:
   a first input in said controller that receives a first output from a feedback device comprising an initial temperature of the heating element; and
   a second input in said controller that receives a second output from said feedback device comprising a post-heat temperature of the heating element.

2. The packaging machine according to claim 1 further comprising a package sensor, the heating element being energized in response to the package sensor detecting the package on the hot plate assembly during use.

3. The packaging machine according to claim 2, wherein the package sensor is a photo eye.

4. The packaging machine according to claim 3, wherein the feedback device is a thermistor.

5. The packaging machine according to claim 1 further comprising one of a thermal fuse and a ground-fault current interrupter adapted to interrupt energization of the heating element if a temperature of the heating element exceeds a temperature design value.

6. The packaging machine according to claim 1, wherein the heating element is a mica heater.

7. The packaging machine according to claim 1, wherein the heating element has a heating ramp rate of approximately 100° F. per second.

8. The packaging machine according to claim 1 further comprising a light emitting diode adapted to display at least two different colors to indicate at least two different operating statuses of the packaging machine.

9. The packaging machine according to claim 8, wherein the first color of the light emitting diode is amber and the second color is red.

10. The packaging machine according to claim 1, wherein the cutting element is a heated rod.

11. The packaging machine of claim 1, wherein the ramp rate is further calculated by:
provising a third input in said controller that receives a third output from a feedback device comprising an initial temperature of the hot plate assembly; and
providing a fourth input in said controller that receives a fourth output from said feedback device comprising a post-heat temperature of the hot plate assembly.

12. A method of operating a packaging machine to fuse heat-sensitive film a package comprising the steps:
providing a sensor for detecting the presence of a package during use on a hot plate assembly of the packaging machine;
providing a controller for measuring a temperature of a heating element;
calculating a ramp rate with said controller for energizing said heating element for a calculated change over a period of time at a calculated change in energy level forming said ramp rate, the ramp rate being calculated by:
providing a first input in said controller that receives a first output from a feedback device comprising an initial temperature of the heating element; and
providing a second input in said controller that receives a second output from said feedback device comprising a post-heat temperature of the heating element.

13. The method according to claim 12 further comprising the step of interrupting the step of energizing if the temperature of the heating element exceeds a temperature design value.

14. The method according to claim 12 further comprising the step of lighting an indicator to indicate an operating status of the packaging machine.

15. The method of operating a packaging machine of claim 12 further comprising the step of energizing the heating element based upon the ramp rate calculation.

16. The method of operating a packaging machine of claim 12, wherein the ramp rate is further calculated by:
providing a third input in said controller that receives a third output from a feedback device comprising an initial temperature of the hot plate assembly; and
providing a fourth input in said controller that receives a fourth output from said feedback device comprising a post-heat temperature of the hot plate assembly.

17. The method of operating a packaging machine of claim 16 further comprising the step of energizing the heating element based upon the ramp rate calculation.

18. A packaging machine for wrapping a package with heat-sensitive film, the packaging machine comprising:
a frame defining a wrapping surface;
a film supply receptacle adapted to receive a supply of heat-sensitive film;
a heated rod adapted to sever a length of heat-sensitive film from the supply used to wrap the package;
a hot plate assembly adapted to fuse the length of heat-sensitive film wrapped around the package, the hot plate assembly including a mica heater heating element having a heating ramp rate provided by a controller; the controller adapted to calculate said ramp rate comprising:
a first input in said controller that receives a first output from a feedback device comprising an initial temperature of the heating element;
a second input in said controller that receives a second output from said feedback device comprising a post-heat temperature of the heating element;
a package sensor, the heating element being energized in response to the package sensor detecting the package on the hot plate assembly;
a ground-fault current interrupter adapted to interrupt energization of the heating element in response to a temperature of the heating element exceeding a temperature design value; and
a light emitting diode adapted to display at least two different colors to indicate at least two different operating statuses of the packaging machine.

19. The packaging machine according to claim 18, wherein the first status corresponds to when the heating element is being energized to heat the hot plate assembly to a fusing temperature and the second status corresponds to when the hot plate assembly has reached the fusing temperature.

20. The packaging machine according to claim 18, wherein the first color of the light emitting diode is amber and the second color is red.

* * * * *